(12) United States Patent
Nagashima

(10) Patent No.: US 11,037,527 B2
(45) Date of Patent: Jun. 15, 2021

(54) DISPLAY APPARATUS AND DISPLAY METHOD

(71) Applicant: CANON KABUSHIKI KAISHA, Tokyo (JP)

(72) Inventor: Yoshiyuki Nagashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/599,233

(22) Filed: Oct. 11, 2019

(65) Prior Publication Data

US 2020/0118523 A1    Apr. 16, 2020

(30) Foreign Application Priority Data

Oct. 15, 2018 (JP) .............................. JP2018-194207

(51) Int. Cl.
*G09G 5/10* (2006.01)
*G06T 5/00* (2006.01)

(52) U.S. Cl.
CPC .............. *G09G 5/10* (2013.01); *G06T 5/009* (2013.01); *G06T 2207/20208* (2013.01); *G09G 2320/0233* (2013.01); *G09G 2320/08* (2013.01); *G09G 2354/00* (2013.01)

(58) Field of Classification Search
CPC ........................ G09G 5/10; G06T 2207/20208
See application file for complete search history.

(56) References Cited

U.S. PATENT DOCUMENTS

| 2005/0285952 | A1* | 12/2005 | Kwon | ...................... H04N 5/20 |
| | | | | 348/234 |
| 2010/0097482 | A1* | 4/2010 | Kuniba | ................... G06T 5/009 |
| | | | | 348/222.1 |
| 2015/0103919 | A1* | 4/2015 | Hattori | .................. H04N 19/30 |
| | | | | 375/240.25 |
| 2017/0064385 | A1* | 3/2017 | Nakajima | .............. G09G 5/006 |
| 2017/0272686 | A1* | 9/2017 | Fukushima | .............. G09G 5/10 |
| 2018/0077332 | A1* | 3/2018 | Shimura | .............. H04N 5/2355 |
| 2019/0303733 | A1* | 10/2019 | Kozuka | .................. H04N 5/232 |

FOREIGN PATENT DOCUMENTS

| JP | 2007-295022 | A | 11/2007 |
| JP | 2016-173477 | A | 9/2016 |
| JP | 2018-046556 | A | 3/2018 |
| WO | 2018/047753 | A1 | 3/2018 |

* cited by examiner

*Primary Examiner* — Phi Hoang
(74) *Attorney, Agent, or Firm* — Cowan, Liebowitz & Latman, P.C.

(57) ABSTRACT

A display apparatus according to the present invention includes at least one memory and at least one processor which function as: an acquisition unit configured to acquire first image data of which a characteristic of an increase in a gradation value with respect to an increase in brightness is converted so that the characteristic differs between above and below a first brightness; a conversion unit configured to convert, based on a second brightness, the first image data into second image data of which a characteristic of an increase in a gradation value with respect to an increase in brightness differs between above and below the second brightness; and a display control unit configured to perform controls so that an image is displayed based on the second image data, wherein the second brightness is not lower than the first brightness.

8 Claims, 9 Drawing Sheets

FIG. 2
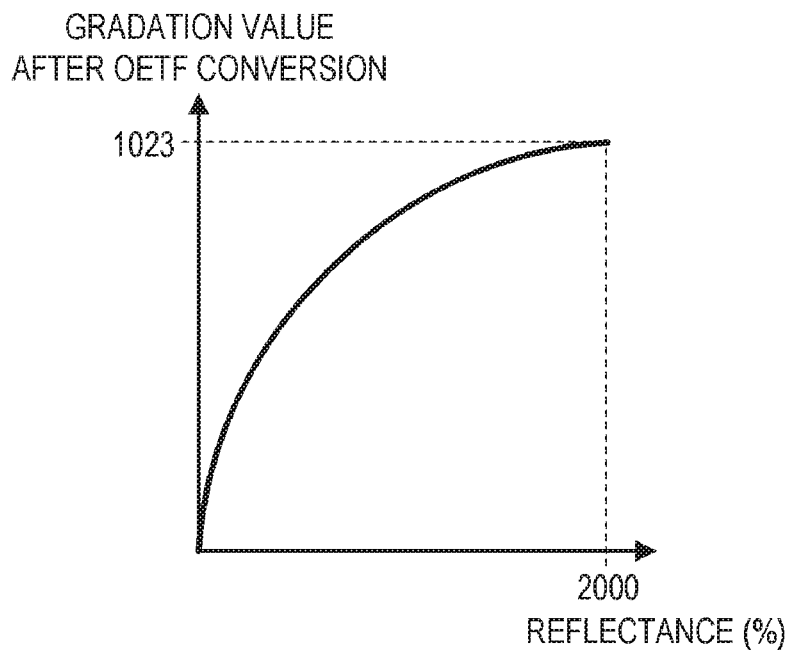
FIG. 3
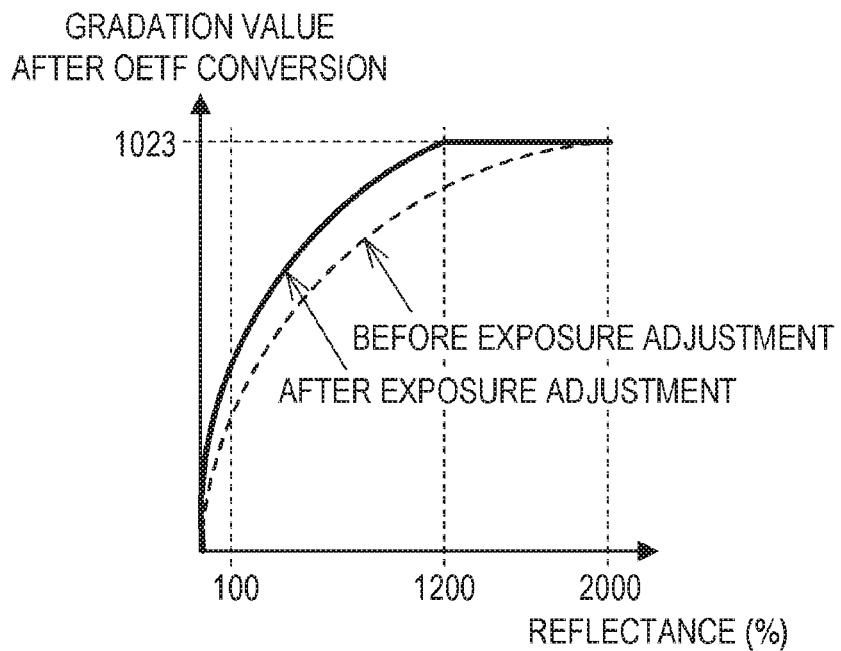
FIG. 4
| FIRST KNEE POINT (%) | 0   800   2000 |

DISPLAY APPARATUS AND DISPLAY METHOD

BACKGROUND OF THE INVENTION

Field of the Invention

The present invention relates to a display apparatus and a display method.

Description of the Related Art

As the light receiving performance of imaging apparatuses improves, an image (image data) having a dynamic range (brightness range) wider than BT 709, which is a standard generally used for video gamma format, is being generated recently. An image having a wide dynamic range is called a "high dynamic range (HDR) image". For the data format of an HDR image, Cineon Log, which is determined based on the characteristics of the film having a wide dynamic range, is used, for example.

In image production work flow, an HDR image is displayed on a display apparatus (display surface of display apparatus), and an image quality adjustment operation, such as brightness adjustment and color adjustment, is performed. In this case, gradation conversion is performed on the HDR image, so that the HDR image is displayed at an appropriate display brightness (brightness on the display surface).

In an imaging apparatus, gradation conversion called "knee correction" may be performed (Japanese Patent Application Publication No. 2007-295022) in order to acquire an image having a wider dynamic range. In a knee corrected image, characteristics of the increase in the gradation value, with respect to the increase in brightness, are different between above and below a certain point. This point is called "knee point". Hereafter the knee correction of an imaging apparatus is called "first knee correction", and a knee point of the first knee correction is called "first knee point". In a brightness range not higher than the first knee point, correspondence between the brightness before the first knee correction (brightness of the object) and the brightness after the first knee correction has a linear characteristic, and in a brightness range higher than the first knee point, this correspondence has a non-linear characteristic. Therefore in the case where an image after the first knee correction is displayed on the display apparatus, it is preferable to display at least the gradation values not higher than the first knee point at a display brightness that corresponds to (approximately the same as) the brightness before the first knee correction (brightness of the object). For the gradation values higher than the first knee point, on the other hand, a requirement level for the image quality is low compared with the gradation values not higher than the first knee point.

In a display apparatus as well, the knee correction may be performed in order to display an image of which gradation in the high brightness region is higher (Japanese Patent Application Publication No. 2016-173477). Hereafter the knee correction of the display apparatus is called "second knee correction", and the knee point of the second knee correction is called "second knee point". In a brightness range not higher than the second knee point, correspondence between the brightness before the second knee correction and brightness after the second knee correction (display brightness) has a linear characteristic, and in a brightness range higher than the second knee point, this correspondence has a non-linear characteristic. Therefore the gradation values not higher than the second knee point can be displayed at a display brightness corresponding to the brightness of the image before the second knee correction. Gradation values higher than the second knee point, on the other hand, are difficult to be displayed at a display brightness corresponding to the brightness before the second knee correction.

In the prior art, the first knee point and the second knee point are set independently and arbitrarily. Therefore in a brightness range that is preferable to be displayed at a display brightness corresponding to the brightness before the second knee correction, in some cases displaying at this display brightness (appropriate brightness) may not be implemented.

SUMMARY OF THE INVENTION

The present invention provides a technique that can implement the display at an appropriate display brightness with higher certainty.

The present invention in its first aspect provides a display apparatus comprising at least one memory and at least one processor which function as:

an acquisition unit configured to acquire first image data of which a characteristic of an increase in a gradation value with respect to an increase in brightness is converted so that the characteristic differs between above and below a first brightness;

a conversion unit configured to convert, based on a second brightness, the first image data into second image data of which a characteristic of an increase in a gradation value with respect to an increase in brightness differs between above and below the second brightness; and a display control unit configured to perform controls so that an image is displayed based on the second image data, wherein the second brightness is not lower than the first brightness.

The present invention in its second aspect provides a display method comprising:

acquiring first image data of which a characteristic of an increase in a gradation value with respect to an increase in brightness is converted so that the characteristic differs between above and below a first brightness;

converting, based on a second brightness, the first image data into second image data of which a characteristic of an increase in a gradation value with respect to an increase in brightness differs between above and below the second brightness; and displaying an image based on the second image data, wherein the second brightness is not lower than the first brightness.

The present invention in its third aspect provides a non-transitory computer readable medium that stores a program, wherein the program causes a computer to execute:

acquiring first image data of which a characteristic of an increase in a gradation value with respect to an increase in brightness is converted so that the characteristic differs between above and below a first brightness;

converting, based on a second brightness, the first image data into second image data of which a characteristic of an increase in a gradation value with respect to an increase in brightness differs between above and below the second brightness; and displaying an image based on the second image data, wherein the second brightness is not lower than the first brightness.

Further features of the present invention will become apparent from the following description of exemplary embodiments with reference to the attached drawings.

BRIEF DESCRIPTION OF THE DRAWINGS

FIG. 2 is a diagram depicting an example of an OETF conversion according to Example 1;

FIG. 3 is a diagram depicting an example of exposure adjustment according to Example 1;

FIG. 4 is a diagram depicting an example of a first knee point input method according to Example 1;

DESCRIPTION OF THE EMBODIMENTS

Example 1

Example 1 of the present invention will be described. A display apparatus according to Example 1 is, for example, a liquid crystal display apparatus, an organic electroluminescence (EL) display apparatus, a plasma display apparatus, a micro electro mechanical system (MEMS) type display apparatus or the like.

Figure 1:
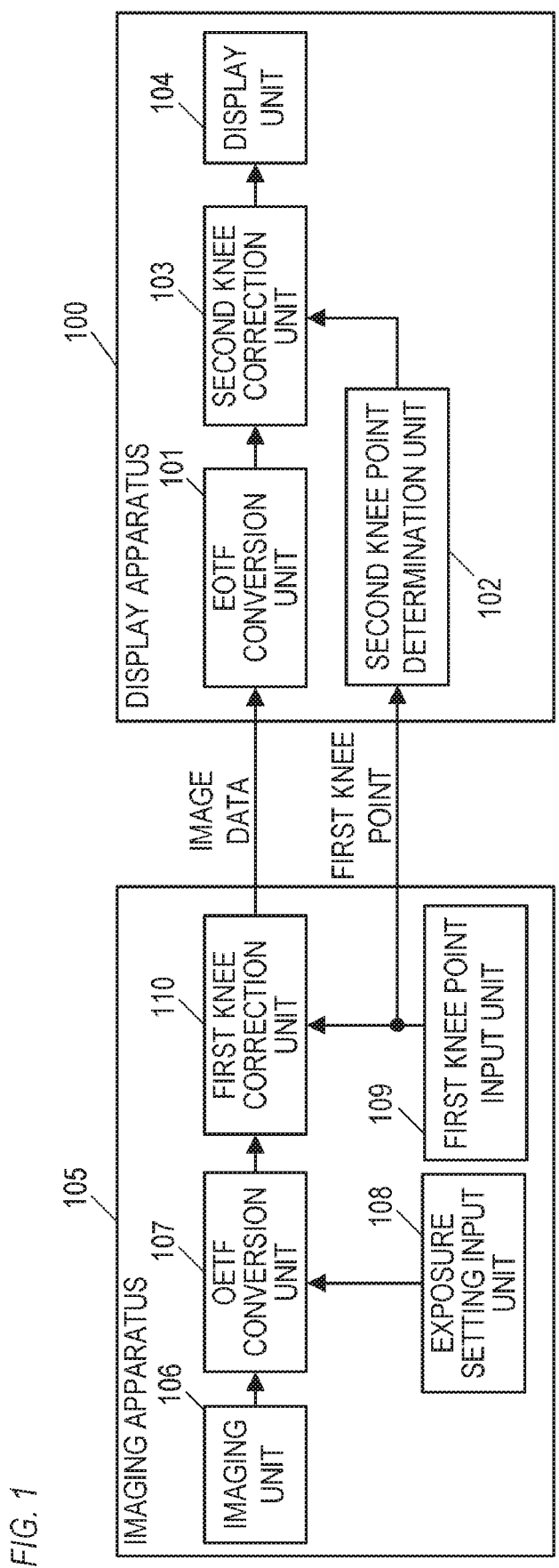
FIG. 1 is a block diagram depicting a configuration example of a display system according to Example 1.

FIG. 1 is a block diagram depicting a configuration example of a display system which includes the display apparatus 100 according to Example 1. The display apparatus 100 is connected to an imaging apparatus 105. The display apparatus 100 includes an EOTF conversion unit 101, a second knee point determination unit 102, a second knee correction unit 103 and a display unit 104. The imaging apparatus 105 includes an imaging unit 106, an OETF conversion unit 107, an exposure setting input unit 108, a first knee point input unit 109 and a first knee correction unit 110.

In the imaging apparatus 105, the imaging unit 106 captures an image of an object, and outputs captured image data (signal of imaging result). The OETF conversion unit 107 performs opto-electronic transfer function (OETF) conversion on the captured image data, and outputs the converted data. The OETF conversion will be described later. The exposure setting input unit 108 receives user operation to specify (input) an exposure setting value, and outputs the exposure setting value in accordance with the user operation. The exposure setting value is used for the OETF conversion. The first knee point input unit 109 receives user operation to specify a first knee point, and outputs information on the first knee point in accordance with the user operation. The information on the first knee point is also outputted outside the imaging apparatus 105. The first knee correction unit 110 performs a first knee correction on the image data after OETF conversion (image data outputted from the OETF conversion unit 107) based on the first knee point, and outputs the corrected data outside the imaging apparatus 105. The first knee correction is a knee correction where the first knee point is a knee point of the first knee correction. The knee correction and the knee point will be described later.

In the display apparatus 100, the EOTF conversion unit 101 acquires input image data (image data that is outputted from the imaging apparatus 105 (first knee correction unit 110), and is inputted to the display apparatus 100). Then the EOTF conversion unit 101 performs the electro optical transfer function (EOTF) conversion on the input image data, and outputs the converted input image data. The EOTF conversion will be described later. The second knee point determination unit 102 acquires input information (information that is outputted from the imaging apparatus 105 (first knee point input unit 109), and is inputted to the display apparatus 100; information on the first knee point). Then the second knee point determination unit 102 determines the second knee point based on the input information, and outputs the determined second knee point. In Example 1, the second knee point is outputted to and set by the second knee correction unit 103. The second knee correction unit 103 performs second knee correction on the image data after the EOTF conversion (image data outputted from the EOTF conversion unit 101) based on the second knee point, and outputs the corrected image data. The display unit 104 displays the image on the display surface based on the image data after the second knee correction (image data that is outputted from the second knee correction unit 103).

The imaging apparatus 105 will be described in detail. The imaging apparatus 105 is an apparatus supporting a wide dynamic range (brightness range) that is called "high dynamic range (HDR)".

The imaging unit 106 is a complementary metal oxide semiconductor (CMOS) sensor, for example, which captures an image of an object via an optical lens, and outputs the captured image data of which gradation value is in proportion to (approximately in proportion to) the brightness of the object via the optical lens. As a format of expressing brightness, a reflectance, when light is reflected by an object, may be used. The brightness of an object irradiated by an environmental light is expressed by 0% to 100% reflectance, and brightness exceeding this brightness (brightness of such light sources as an illumination apparatus and the sun) is often expressed by a reflectance higher than 100%. In Example 1, it is assumed that reflectance is used to express the brightness of an object, and that the imaging unit 106 can capture an image of an object of which reflectance is 2000% or less.

The data size of the captured image data, of which gradation value is in proportion to the brightness of an object, is large. The OETF conversion unit 107 performs the OETF conversion on the captured image data in order to acquire image data, of which data size is smaller (range of gradation value is narrower) and dynamic range is wider. Then the OETF conversion unit 107 outputs the image data after the OETF conversion, in Example 1, the gradation values of the image data after the OETF conversion are assumed to be 10-bit values (0 to 1023). In the OETF conversion performed by the OETF conversion unit 107, it is assumed that each gradation value of the captured image data is converted in accordance with the correspondence indicated in FIG. 2 (non-linear characteristic (logarithmic characteristic) where the gradation values 0 to 1023 after the OETF conversion are corresponded to the reflectance 0% to 2000%) (gradation conversion).

The characteristic of the OETF conversion (correspondence between the reflectance (gradation value before OETF conversion; input value of the OETF conversion unit 107) and the gradation value (gradation value after OETF conversion; output value of the OETF conversion unit 107)) depends on the HDR standard. The HDR standards are, for example, hybrid log-gamma (HLG), perceptual quantization (PQ) or the like. Further, a log curve (mathematical formula) unique to a manufacturer of an imaging apparatus is also specified as the characteristic of the OETF conversion.

The OETF conversion unit 107 also performs exposure adjustment based on the exposure setting value inputted to the exposure setting input unit 108 (exposure setting value specified by the user). The exposure adjustment can be regarded as the "brightness adjustment of the object in the image data". In Example 1, in the OETF conversion unit 107, the exposure adjustment is performed by increasing or decreasing the gradation value (output value) based on e exposure setting value.

In Example 1, it is assumed that the OETF conversion unit 107 performs the exposure adjustment so that the output value of reflectance 100% increases, and the captured image data is converted and outputted so that the image data converted to have the characteristic indicated by the solid line in FIG. 3 is acquired. In FIG. 3, the characteristic before the exposure adjustment (the same as FIG. 2) is also indicated by the broken line. In the example in FIG. 3, the output value corresponding to the reflectance 100% increases due to the exposure adjustment, therefore the reflectance 100% can be displayed at a higher display brightness (brightness on the display surface) However for a reflectance higher than 1200%, the output value is saturated at the upper limit value 1023. This means that the dynamic range of the image data outputted from the OETF conversion unit 107 is reduced from the range of the reflectance 0% to 2000% to the range of the reflectance 0% to 1200%.

In order to suppress such reduction of the dynamic range, the first knee correction unit 110 performs a first knee correction. The first knee correction may be performed even if exposure adjustment is not performed. For example, the first knee correction may be performed to expand the dynamic range of the captured image data in the OETF conversion. The knee correction is a gradation conversion to acquire image data in which a characteristic of an increase in a gradation value with respect to an increase in brightness above a knee point and a characteristic of an increase in a gradation value with respect to an increase in brightness below the knee point are different from each other. In other words, the first knee correction is gradation conversion to acquire image data in which a characteristic of an increase in a gradation value with respect to an increase in brightness above the first knee point and a characteristic of an increase in a gradation value with respect to an increase in brightness below the first knee point are different from each other.

In Example 1, the graphic image in FIG. 4 (on screen display (OSD) image; graphical user interface (GUI) image) is displayed on the display unit (not illustrated) of the imaging apparatus 105. Then the user inputs a first knee point in the first knee point input unit 109 by user operation using this graphic image. In Example 1, it is assumed that the following value is set as the reflectance (brightness) of the first knee point.

Reflectance of first knee point=800%

Figure 5:
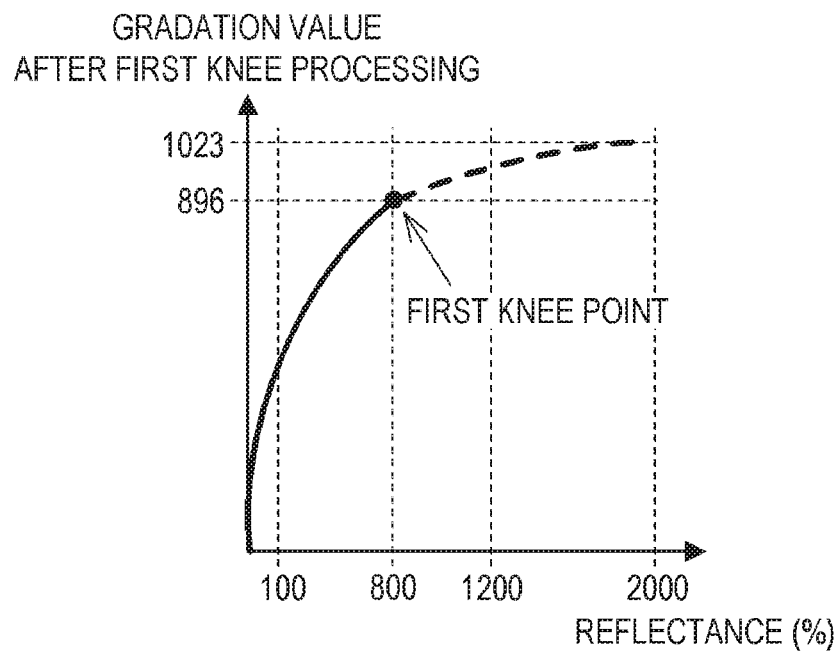
FIG. 5 is a diagram depicting an example of a first knee correction according to Example 1.

The first knee correction unit 110 performs the first knee correction, based on the first knee point, on the image data after the OETF conversion (image data outputted from the OETF conversion unit 107), and outputs the corrected image data outside the imaging apparatus 105. In concrete terms, as indicated by the broken line in FIG. 5, the characteristic of the range higher than the first knee point is changed by the first knee correction, so that the gradation value increases (exponentially) with respect to the increase in brightness (reflectance of the object) in the entire range. As indicated by the solid line in FIG. 5, the characteristic of the range not higher than the first knee point is not changed.

In Example 1, image data having the following characteristics is outputted from the imaging apparatus 105 as a result of the above mentioned processing.

Range of reflectance not higher than 800%:

The correspondence between the brightness of the object and the brightness after the first knee correction (brightness indicated by the image data outputted from the first knee correction unit 110) has a linear characteristic.

Range of reflectance higher than 800%:

The correspondence between the brightness of the object and the brightness after the first knee correction has a non-linear characteristic, but the brightness after the first knee correction increases as the brightness of the object increases.

The display apparatus 100 will be described in detail. The display apparatus 100 is also an apparatus supporting a wide dynamic range that is called "high dynamic range (HDR)". In Example 1, the range of the display brightness is assumed to be a range of 0 to 1000 nits.

The EOTF conversion unit 101 acquires input image data (image data that is outputted from the imaging apparatus 105 (first knee correction unit 110) and is inputted to the display apparatus 100). Then the EOTF conversion unit 101 performs the EOTF conversion on the input image data, and outputs the converted input image data. In Example 1, by the EOTF conversion, it is assumed that each gradation value of the captured image data is converted in accordance with the correspondence indicated in FIG. 6 (non-linear characteristic (exponential characteristic), where the display brightness 0 to 1000 nits are corresponded to the gradation values 0 to 1023 of the input image data) (gradation conversion).

Figure 6:
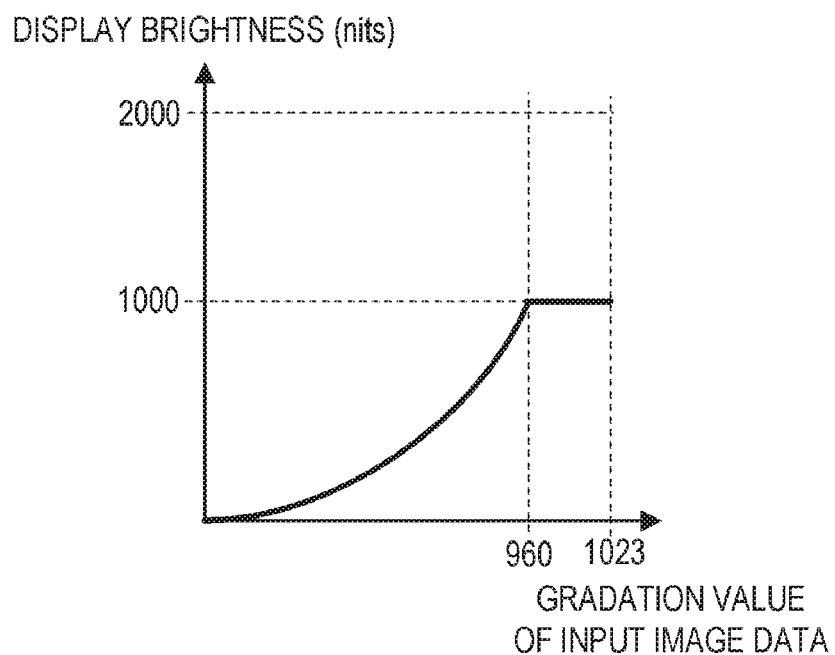
FIG. 6 is a diagram depicting an example of an EOTF conversion according to Example 1.
Figure 7:
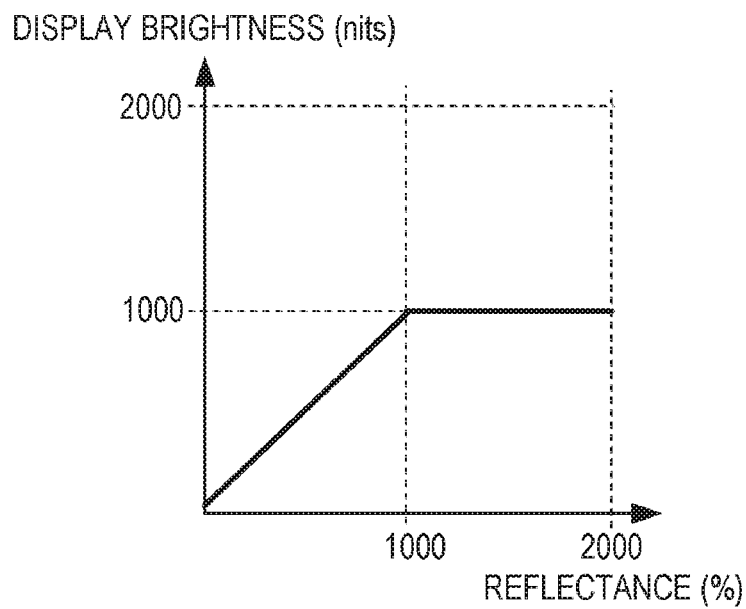
FIG. 7 is a diagram depicting an example of the EOTF conversion according to Example 1.

In Example 1, it is assumed that the characteristic (function) of the EOTF conversion is based on the inverse characteristic (inverse function) of the characteristic (function) of the OETF conversion. In other words, the characteristic in FIG. 6 is based on the characteristic in FIG. 2. Therefore as the image data after the EOTF conversion, the image data of which gradation value is in proportion to the brightness of the object is acquired (generated). This means that if the image data after the EOTF conversion is used, display brightness in proportion to the brightness of the object can be implemented, as indicated in FIG. 7.

In Example 1, the unit (%) of the reflectance may be regarded as the unit (nits) of the display brightness. As mentioned above, the range of the display brightness is 0 to 1000 nits, that is, narrower than the dynamic range (0% to 2000%) of the captured image data and input image data. Hence as indicated in FIG. 7, the reflectance higher than 1000% becomes a display brightness of 1000 nits (clipped). In other words, the dynamic range of the input image data is converted (compressed in Example 1) by the EOTF conversion (range conversion). In concrete terms, as indicated in FIG. 6, the gradation value 960 corresponding to the reflectance 1000% is converted (clipped) into a gradation value corresponding to the display brightness 1000 nits.

By the above mentioned clipping, the same gradation value or display brightness corresponds to a plurality of reflectances higher than 1000%, hence the gradation distribution (gradation of image) in the high brightness portion cannot be confirmed (gradation clipping). To suppress this gradation clipping, the second knee correction unit 103 performs the second knee correction. In some cases, the second knee correction may be performed even when clipping is not performed. For example, the second knee correction may be performed to expand the dynamic range of the input image data in the EOTF conversion.

As mentioned above, in the brightness range not higher than the first knee point, the correspondence between the brightness of the object and the brightness indicated by the input image data has a linear characteristic. Therefore it is preferable that at least gradation values not higher than the first knee point is displayed at a display brightness corresponding to (approximately the same as) the brightness of the object. By the second knee correction, the correspondence between the brightness of the input image data and the display brightness has a linear characteristic in the brightness range not higher than the second knee point, but the correspondence between the brightness of the input image data and the display brightness in the brightness range has a non-linear characteristic in the brightness range higher than the second knee point. This means that if the brightness of the second knee point is lower than the brightness of the first knee point, the gradation values higher than the second knee point and not higher than the first knee point cannot be displayed at the display brightness corresponding to the brightness of the object.

Therefore in Example 1, the second knee point determination unit 102 acquires the input information (information that is outputted from the imaging apparatus 105 (first knee point input unit 109) and is inputted to the display apparatus 100; information on the first knee point). Then the second knee point determination unit 102 determines the second knee point, of which brightness is not higher than the brightness of the first knee point based on the input information, and outputs the determined second knee point. In Example 1, it is assumed that the same value as the brightness of the first knee point is set as the brightness of the second knee point.

Second knee point=800%

=896 (gradation value of input image data)

The method of acquiring the information on the first knee point is not especially limited. Here a case of connecting the imaging apparatus 105 and the display apparatus 100 via a serial digital interface (SDI) is considered. In this case, the imaging apparatus 105 can write the information on the first knee point in an ancillary region of the SDI, and output this information together with the image data. Then the display apparatus 100 can acquire the image data outputted from the imaging apparatus 105 and the information written in the ancillary region. A similar processing can be performed even in the case of connecting the imaging apparatus 105 and the display apparatus 100 via a high-definition multimedia interface (HDMI).

Figure 8:
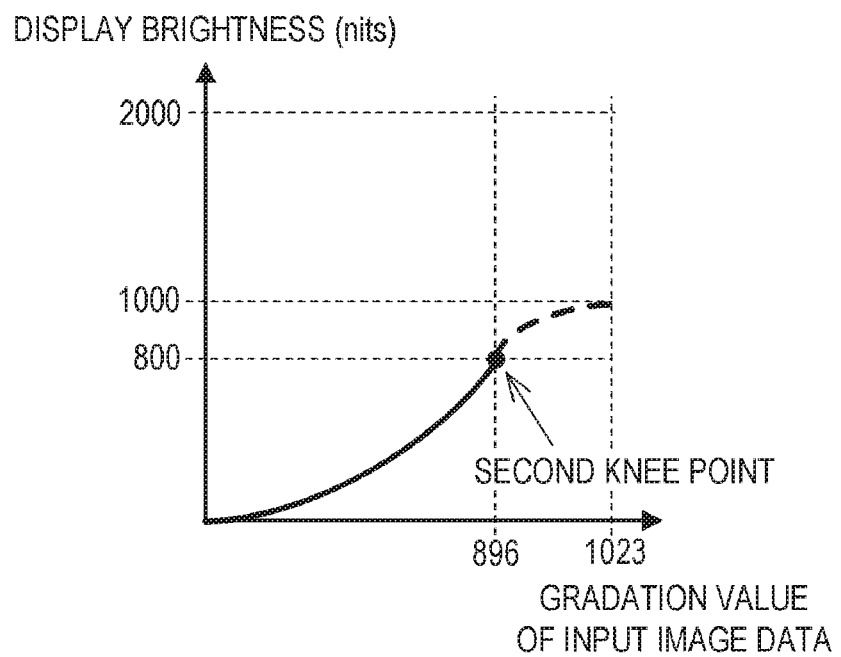
FIG. 8 is a diagram depicting an example of a second knee correction according to Example 1.

The second knee correction unit 103 performs the second knee correction according to the second knee point on the image data after the EOTF conversion (the image data after the EOTF conversion unit 101), and outputs the corrected image data. In concrete terms, as indicated by the broken lines in FIGS. 8 and 9, the characteristic of the range higher than the second knee point is changed by the second knee correction so that the display brightness increases (exponentially) with respect to the increases in the gradation value and the reflectance in the entire range (characteristic conversion). As indicated by the solid lines in FIGS. 8 and 9, the characteristic of the range not higher than the second knee point is not changed.

Figure 9:
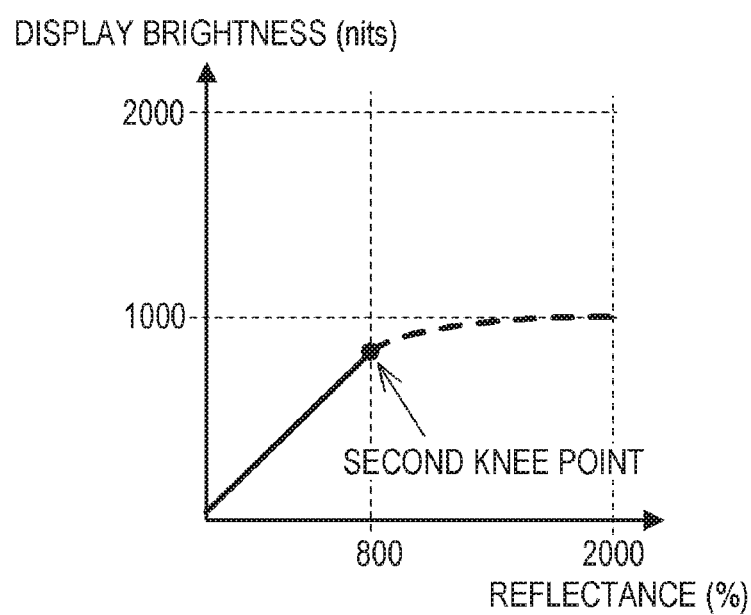
FIG. 9 is a diagram depicting an example of the second knee correction according to Example 1.

In Example 1, as indicated in FIG. 9, the linear characteristic where the display brightness is in proportion to the brightness of the object can be acquired for the brightness range (0% to 800%), in which the correspondence between the brightness of the object and the brightness indicated by the input image data has a linear characteristic. For the other brightness range, the non-linear characteristic where the display brightness increases as the brightness of the object increases can be acquired and the gradation clipping can be suppressed. In other words, the following is established.

Range of reflectance not higher than 800%:

The correspondence between the brightness of the object and the display brightness has a linear characteristic.

Range of reflectance higher than 800%:

The correspondence between the brightness of the object and the display brightness has a non-linear characteristic, but the display brightness increases as the brightness of the object increases.

As described above, according to Example 1, the display at an appropriate display brightness can be implemented with higher certainty. In concrete terms, the display brightness corresponding to the brightness of the object can be appropriately implemented, even in the case where a knee corrected image data is displayed with further knee correction.

In the case described in Example 1, the imaging apparatus 105 performs the first knee correction, the imaging apparatus 105 and the display apparatus 100 are connected, and the display apparatus 100 independently acquires the image data and the information on the first knee point from the imaging apparatus 105, but the present invention is not limited to this. For example, the apparatus that performs the first knee correction need not be the imaging apparatus 105. The information on the first knee point may be attached to the image data after the first knee correction as meta data. In this case, the display apparatus 100 may be connected to an apparatus different from the apparatus that performs the first knee correction (e.g. editing apparatus that is used in the editing step of the image), since the information on the first knee point can be acquired by acquiring the meta data attached to the image data from the connected apparatus.

When image data on which the knee correction has not been performed is received, the display apparatus 100 may use a predetermined knee point as the second knee point. The dynamic range of the image data after the second knee processing may be narrower or wider than the dynamic range of the image data before the second knee processing. The dynamic range of the image data after the second knee processing may be narrower or wider than the range of the display brightness. The EOTF conversion and the second knee processing may not be performed independently In the case described in Example 1, the first knee point is specified by reflectance (%) (FIG. 4), but the first knee point may be specified by the gradation value (0 to 1023; gradation value after the exposure adjustment indicated in FIG. 3), or may be specified by brightness (nits). In the same manner, the information on the first knee point may be information indicating the reflectance, or information indicating the gradation value, or information indicating the brightness. The information on the first knee point may include at least two of these three information.

The brightness (nits) of the first knee point can be calculated from the gradation value after the exposure adjustment indicated in FIG. 3, using the function (characteristic) of the EOTF conversion indicated in FIG. 6. For the function of the EOTF conversion, however, a function that does not cause clipping is used. The brightness (nits) of the first knee point may be calculated by another method. For example, an exposure set value (relationship between reflectance 100% and brightness (nits)), that is set by the imaging apparatus 105, is sent to the display apparatus 100. The display apparatus 100 determines the function (characteristic) indicated in FIG. 7 based on the exposure set value, and calculates the brightness (nits) from the reflectance (%) of the first knee point using the determined function. For the function, however, a function which does not cause clipping is used. The reflectance (%) of the first knee point can be converted into the absolute brightness based on the exposure reference value (reference value of the exposure set value) of the imaging apparatus 105.

Example 2

Example 2 of the present invention will be described. In the case described in Example 1, the brightness of the first knee point is not higher than the upper limit of the display brightness (upper limit of the brightness of the image data after the second knee processing). In Embodiment 2, a case where the brightness of the first knee point is higher than the upper limit of the display brightness will be described. In the following, aspects (configuration, processing, etc.) that are different from Example 1 will be described in detail, and description on aspects that are the same as Example 1 will be omitted.

Figure 10:
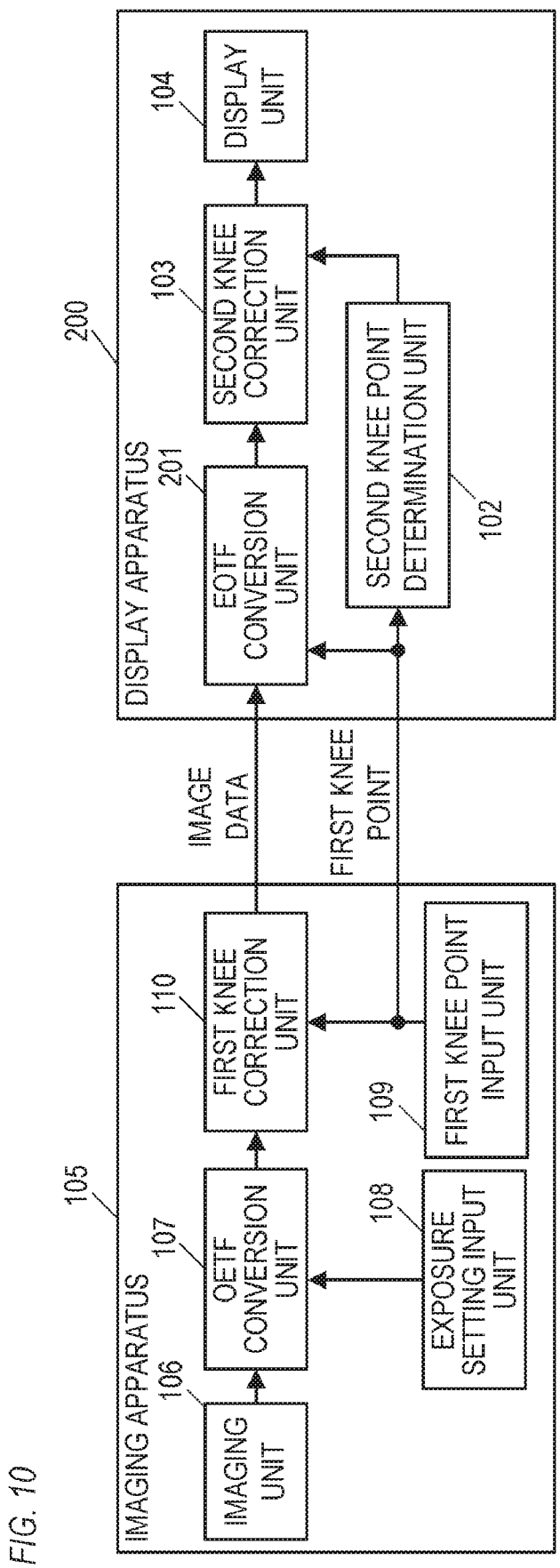
FIG. 10 is a block diagram depicting a configuration example of a display system according to Example 2.

FIG. 10 is a block diagram depicting a configuration example of a display system according to Example 2. In FIG. 10, a block the same as FIG. 1 (Example 1) is denoted with the same reference sign as FIG. 1.

In a display apparatus 200, an EOTF conversion unit 201 has a similar function as the EOTF conversion unit 101 in FIG. 1. The EOTF conversion unit 201, however, acquires the information on the first knee point from the imaging apparatus 105. Then if the brightness of the first knee point is higher than the upper limit of the display brightness, the EOTF conversion unit 201 converts the dynamic range of the image data (input image data) based on the first knee point. Thereby image data, in which brightness (display brightness) is in proportion to (approximately in proportion to) the brightness of the input image data (brightness of the object) in a specific brightness range, is generated.

Figure 11:
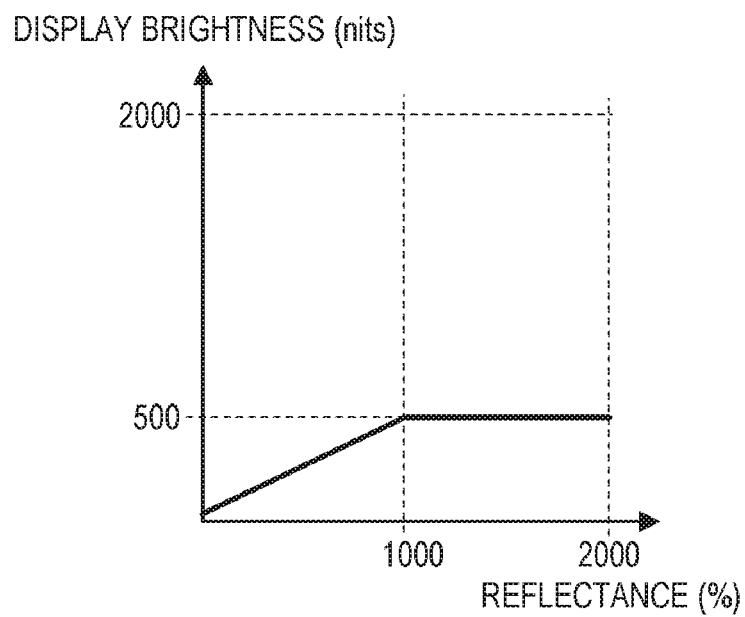
FIG. 11 is a diagram depicting an example of an EOTF conversion according to Example 2.

In Example 2, it is assumed that the brightness of the first knee point is 800% (800 nits), and the upper limit of the display brightness is 500 nits. It is also assumed that the EOTF conversion unit 201 uses the brightness range that is not higher than 1000 nits as the specific brightness range. Therefore, as illustrated in FIG. 11, the dynamic range of the input image is compressed from a 0 to 1000% brightness range to a 0 to 500 nits brightness range.

As a result, the display brightness of the image drops in general, but the linearity of the change of the display brightness, with respect to the change of the reflectance, can be maintained. The lower limit of the display brightness in the specific brightness range is not limited to 1000%, but may any brightness that is not lower than the brightness of the second knee point. The compression method to compress the dynamic range is not especially limited. For example, various methods which have been proposed (e.g. the method according to Japanese Patent Application Publication No. 2016-173477) can be used for the compression method.

Figure 12:
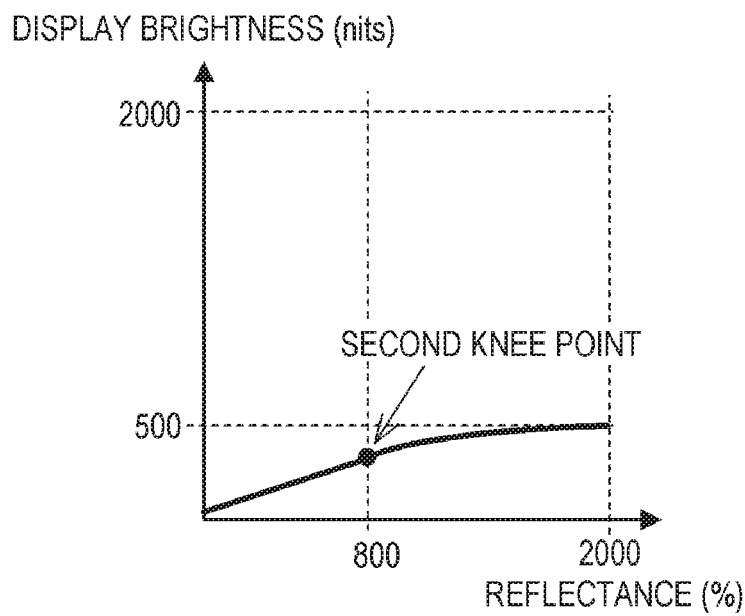
FIG. 12 is a diagram depicting an example of a second knee correction according to Example 2.

The image data outputted from the EOTF conversion unit 201 is corrected by the second knee correction unit 103 (second knee correction), and is displayed on the display unit 104. The characteristic in FIG. 11 is converted into the characteristic in FIG. 12 by performing the second knee correction with setting the brightness of the second knee point to 800%.

As described above, according to Example 2, display at an appropriate display brightness can be implemented even when the brightness of the first knee point is higher than the upper limit of the display brightness (upper limit of the brightness of the image data after the second knee processing). In concrete terms, in the brightness range that is not higher than the brightness of the first knee point, the display brightness in proportion to the brightness of the object, can be implemented even if the display brightness is lower than the brightness of the object.

Example 3

Example 3 of the present invention will be described. In the case described in Example 1, the second knee point is automatically determined and set based on the first knee point. In Example 3, a case where the second knee point is set in accordance with the user operation to specify the second knee point will be described. In the following, aspects (configuration, processing, etc.) different from Example 1 will be described in detail, and description on the aspects the same as Example 1 will be omitted.

Figure 13:
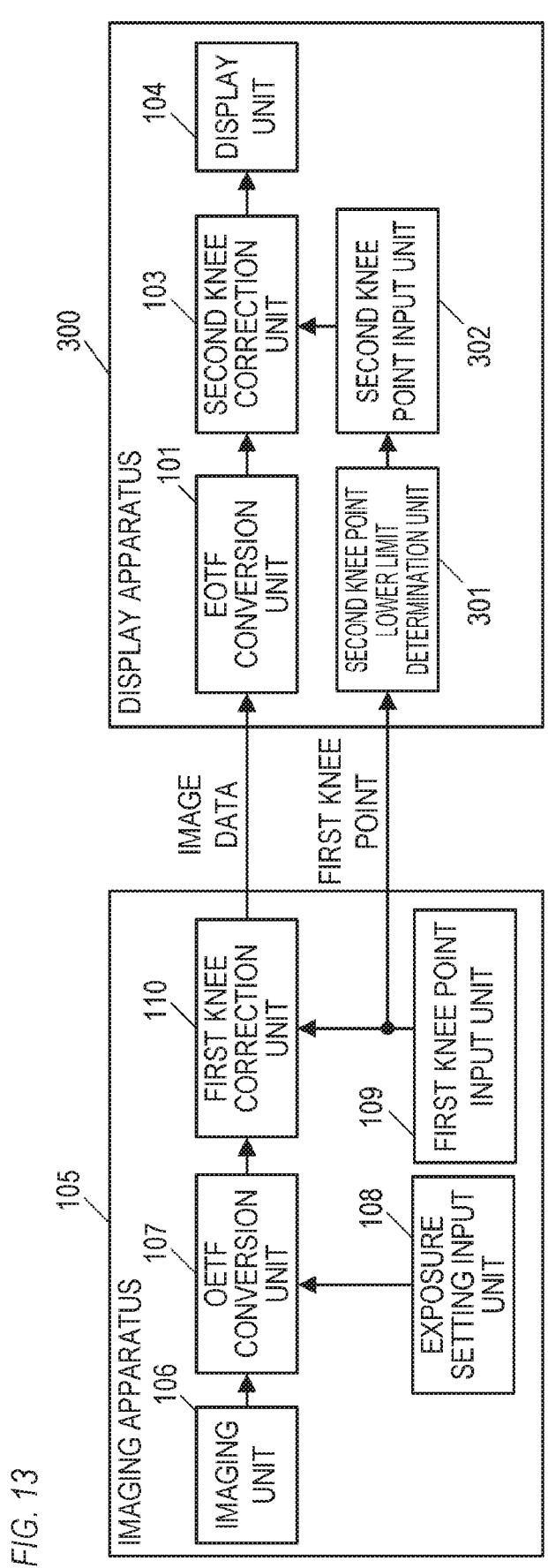
FIG. 13 is a block diagram depicting a configuration example of a display system according to Example 3.

FIG. 13 is a block diagram depicting a configuration example of a display system according to Example 3. This is a block diagram to which Embodiment 3 of the present invention can be applied. In FIG. 13, a block the same as FIG. 1 (Example 1) is denoted with the same reference sign as FIG. 1. A display apparatus 300 includes a second knee point lower limit determination unit 301 and a second knee point input unit 302, instead of the second knee point determination unit 102 in FIG. 1.

The second knee point lower limit determination unit 301 acquires input information (information that is outputted from the imaging apparatus 105 (first knee point input unit 109), and is inputted to the display apparatus 100; information on the first knee point). Then, based on the input information, the second knee point lower limit determination unit 301 notifies the first knee point (brightness of first knee point) to the second knee point input unit 302 as the lower limit of the second knee point (brightness of second knee point).

Based on the notification from the second knee point lower limit determination unit 301, the second knee point input unit 302 receives user operation to specify the second knee point so that the first knee point becomes the lower limit of the second knee point. Then the second knee point input unit 302 outputs the second knee point in accordance with the user operation (second knee point specified by the user operation), to the second knee correction unit 103, and sets the second knee point.

Figure 14:
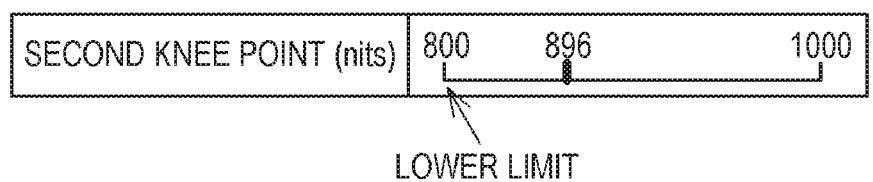
FIG. 14 is a diagram depicting an example of a second knee point input method according to Example 3.

In Example 3, it is assumed that the brightness of the first knee point is 800% (800 nits). Therefore the graphic image indicated in FIG. 14 (on screen display (OSD) image; graphical user interface (GUI) image) is displayed on the display unit 104. Then the user inputs the second knee point to the second knee point input unit 302 by user operation using this graphic image. In the graphic image in FIG. 14, 800 nits (brightness of first knee point) is indicated as the lower limit of the brightness of the second knee point. The user can specify the brightness that is not lower than 800 nits as the brightness of the second knee point, and cannot specify the brightness that is lower than 800 nits as the brightness of the second knee point.

As described above, according to Example 3, the user can specify the brightness that is not lower than the first knee point as the brightness of the second knee point. Thereby display at a more appropriate display brightness can be implemented with higher certainty.

An arbitrary second knee point may be set by user operation before determining the first knee point. Then the display apparatus 300 may output the information on the brightness of the second knee point outside the display apparatus 300, so that the brightness of the second knee point becomes the upper limit of the brightness of the first knee point. In this case, the imaging apparatus 105 displays the graphic image indicated in FIG. 15 on the display unit (not illustrated). The user inputs the first knee point to the first knee point input unit 109 by user operation using this graphic image.

Figure 15:
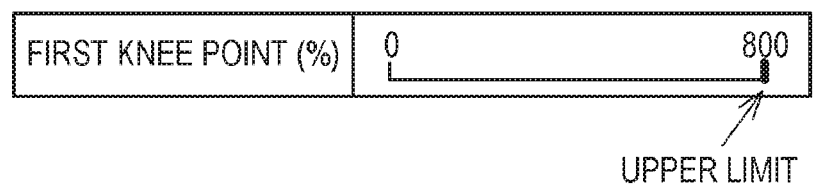
FIG. 15 is a diagram depicting an example of a first knee point input method according to a modification.

FIG. 15 is an example when the brightness of the second knee point is 800 nits (800%). In the graphic image in FIG. 15, 800 nits (brightness of the second knee point) is indicated as the upper limit of the brightness of the first knee point. The user can specify the brightness that is not higher than 800 nits as the brightness of the first knee point, and cannot specify the brightness that is higher than 800 nits as the brightness of the first knee point.

In Example 3, a case of specifying the second knee point by brightness (nits) was described (FIG. 14), but the second knee point may be specified by the gradation value or may be specified by the reflectance (%). In the same manner, the information on the second knee point may be information that indicates the reflectance, or information indicating the gradation, or information that indicates the brightness. The information on the second knee point may include at least two of these three information.

Each block of Examples 1 to 3 (FIGS. 1, 10 and 13) may or may not be independent hardware. The functions of at least two blocks may be implemented by common hardware. Each of a plurality of functions of one block may be implemented by independent hardware. At least two functions of one block may be implemented by common hardware. Each block may or may not be implemented by hardware. For example, the apparatus may include a processor and memory storing a control program. The functions of at least a part of the blocks of the apparatus may be implemented by the processor reading the control program from the memory, and executing the control program.

Examples 1 to 3 (including the above mentioned modifications) are merely exemplary, and the configurations acquired by appropriately modifying or changing the configurations of Examples 1 to 3 within the scope of the essence of the present invention are also included in the present invention. Configurations implemented by appropriately combining the configurations of Examples 1 to 3 are also included in the present invention.

According to the present disclosure, the display at an appropriate display brightness can be implemented with higher certainty.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-194207, filed on Oct. 15, 2018, which is hereby incorporated by reference herein in its entirety.

What is claimed is:

1. A display apparatus comprising at least one memory and at least one processor which function as:
    a first acquisition unit configured to acquire first image data of which a characteristic of an increase in a gradation value with respect to an increase in brightness is converted so that the characteristic differs between above and below a first brightness;
    a second acquisition unit configured to acquire information on the first brightness;
    a setting unit configured to set a second brightness based on the information;
    a conversion unit configured to convert, based on the second brightness, the first image data into second image data of which a characteristic of an increase in a gradation value with respect to an increase in brightness differs between above and below the second brightness; and
    a display control unit configured to perform controls so that an image is displayed based on the second image data, wherein
    the second brightness is not lower than the first brightness.

2. The display apparatus according to claim 1, wherein
    each of the first image data and the second image data is image data after knee correction,
    the first brightness corresponds to a knee point in knee correction to acquire the first image data, and
    the second brightness corresponds to a knee point in knee correction to acquire the second image data.

3. The display apparatus according to claim 1, wherein a brightness range of the first image data is narrower than a brightness range of the second image data.

4. The display apparatus according to claim 1, wherein the setting unit automatically sets the second brightness based on the information.

5. The display apparatus according to claim 1, wherein the setting unit
receives user operation to specify the second brightness, so that the first brightness is set to a lower limit of the second brightness based on the information, and
sets the second brightness specified by the user operation.

6. The display apparatus according to claim 1, wherein the at least one memory and at least one processor further function as:
a setting unit configured to set the second brightness in accordance with a user operation; and
an output control unit perform control so that information on the second brightness is outputted outside the display apparatus, the information being information for setting the second brightness to an upper limit of the first brightness.

7. A display method comprising:
acquiring first image data of which a characteristic of an increase in a gradation value with respect to an increase in brightness is converted so that the characteristic differs between above and below a first brightness;
acquiring information on the first brightness;
setting a second brightness based on the information;
converting, based on the second brightness, the first image data into second image data of which a characteristic of an increase in a gradation value with respect to an increase in brightness differs between above and below the second brightness; and
displaying an image based on the second image data,
wherein
the second brightness is not lower than the first brightness.

8. A non-transitory computer readable medium that stores a program, wherein the program causes a computer to execute:
acquiring first image data of which a characteristic of an increase in a gradation value with respect to an increase in brightness is converted so that the characteristic differs between above and below a first brightness;
acquiring information on the first brightness;
setting a second brightness based on the information;
converting, based on the second brightness, the first image data into second image data of which a characteristic of an increase in a gradation value with respect to an increase in brightness differs between above and below the second brightness; and
displaying an image based on the second image data,
wherein
the second brightness is not lower than the first brightness.

* * * * *